(12) United States Patent
Otsuka et al.

(10) Patent No.: US 9,385,386 B2
(45) Date of Patent: Jul. 5, 2016

(54) SOLID OXIDE FUEL CELL SYSTEM

(75) Inventors: Toshiharu Otsuka, Nakama (JP);
Katsuhisa Tsuchiya, Chigasaki (JP);
Tsukasa Shigezumi, Nishinomiya (JP);
Toshiharu Ooe, Chigasaki (JP);
Kiyotaka Nakano, Narashino (JP);
Takuya Matsuo, Yokohama (JP)

(73) Assignee: TOTO LTD., Fukuoka (JP)

(*) Notice: Subject to any disclaimer, the term of this patent is extended or adjusted under 35 U.S.C. 154(b) by 692 days.

(21) Appl. No.: 13/876,934

(22) PCT Filed: Sep. 28, 2011

(86) PCT No.: PCT/JP2011/072224
§ 371 (c)(1),
(2), (4) Date: Mar. 29, 2013

(87) PCT Pub. No.: WO2012/043646
PCT Pub. Date: Apr. 5, 2012

(65) Prior Publication Data
US 2013/0216926 A1    Aug. 22, 2013

(30) Foreign Application Priority Data

Sep. 30, 2010   (JP) ................................. 2010-222104

(51) Int. Cl.
*H01M 8/06* (2016.01)
*H01M 8/04* (2016.01)
*H01M 8/12* (2016.01)

(52) U.S. Cl.
CPC ........ *H01M 8/0606* (2013.01); *H01M 8/04022* (2013.01); *H01M 8/04268* (2013.01); *H01M 8/04373* (2013.01); *H01M 8/04776* (2013.01); *H01M 8/0618* (2013.01);

(Continued)

(58) Field of Classification Search
None
See application file for complete search history.

(56) References Cited

FOREIGN PATENT DOCUMENTS

| JP | 07296834 A | * 11/1995 |
| JP | 2008-135268 A | 6/2008 |

(Continued)

OTHER PUBLICATIONS

Watanabe et al., JP 2010108826 A, Translation.*

(Continued)

*Primary Examiner* — Patrick Ryan
*Assistant Examiner* — Haixia Zhang
(74) *Attorney, Agent, or Firm* — Brinks Gilson & Lione

(57) ABSTRACT

A solid oxide fuel cell system is disclosed. The solid oxide fuel cell system includes a cell stack having multiple adjacent fuel cells; a reformer that reforms raw gas and produces fuel gas supplied to the fuel cells; a combustion section that causes combustion of the fuel gas discharged from the fuel cells and heats the reformer with combustion heat of the fuel gas; an ignition device that ignites the combustion section; a combustion state confirmation device that senses that heating of the entire reformer has started using the advancement of flame transfer between fuel cells in the combustion section; and a controller programmed to start an operation of the system heating the reformer by using combustion heat from the combustion section and reaction heat from the partial oxidation reforming reaction (POX) in the reformer. During the period until the combustion state confirmation device senses that the heating of the entire reformer has started after the ignition device ignited the combustion section, the controller suppresses the amount of heat emitted by the partial oxidation reforming reaction in the reformer more than the amount of heat emitted after heating of the entire reformer has started.

2 Claims, 9 Drawing Sheets

(52) U.S. Cl.
CPC ....... *H01M 2008/1293* (2013.01); *Y02E 60/50* (2013.01); *Y02E 60/525* (2013.01)

(56) References Cited

FOREIGN PATENT DOCUMENTS

| JP | 2009-104980 A | | 5/2009 |
|----|---------------|---|--------|
| JP | 2009-187964 A | | 8/2009 |
| JP | 2010-067547 A | | 3/2010 |
| JP | 2010-067548 A | | 3/2010 |
| JP | 2010067548 A | * | 3/2010 |
| JP | 2010108826 A | * | 5/2010 |

OTHER PUBLICATIONS

Extended European Search Report in corresponding European Application No. 11829199.6, dated Jul. 28, 2015, 6 pages.
International Search Report for International Application No. PCT/JP2011/072224, dated Jan. 10, 2012, 2 pages.
Written Opinion of the International Searching Authority for International Application No. PCT/JP2011/072224, dated Jan. 10, 2012, 4 pages.
International Preliminary Report on Patentability for International Application No. PCT/JP2011/072224, dated Apr. 9, 2013, 5 pages.

* cited by examiner

100 # SOLID OXIDE FUEL CELL SYSTEM

This application is a 371 application of PCT/JP2011/072224 having an international filing date of Sep. 28, 2011, which claims priority to JP 2010-222104 filed Sep. 30, 2010, the entire contents of which are incorporated herein by reference.

TECHNICAL FIELD

The present invention relates to a solid oxide fuel cell system, and more particularly to a solid oxide fuel cell system that prevents excess temperature rises at the time of startup.

BACKGROUND ART

In the past, a method was known whereby in an solid oxide fuel cell system (SOFC), upon startup fuel gas discharged from multiple fuel cells was combusted, and as the reformer was heated using that combustion heat, a sequence was executed in accordance with each of the stages of startup including a partial oxidation reforming reaction (POX) of fuel gas, an auto-thermal reforming reaction (ATR), and an steam reforming reaction (SR), thereby raising the temperature of the reformer etc.

In fuel cells of this type, gas discharged from the fuel cell is ignited by ignition devices such as ignition heaters, igniters, and the like to start combustion.

However, it is not realistic from a cost standpoint to provide ignition devices for all of multiple fuel cells. Therefore ignition by an ignition device is performed only for fuel gas discharged from a portion of fuel cells, following which all fuel cells are ultimately ignited by causing flame to move to adjacent cells (see, for example, JP2008-135268A).

SUMMARY OF THE INVENTION

Problems the Invention Seeks to Resolve

There are some cases, however, in which the transfer of flame between adjacent fuel cells is not performed smoothly, so that a long time period is required before ignition is competed in all the fuel cells. In a state whereby only a portion of the fuel cells are ignited, and other fuel cells are unignited, a phenomenon was occurring whereby inducing a partial oxidation reforming reaction in which the same flow amounts as normal of fuel gas and reforming air are supplied to the reformer leads to localized heating without heating the entire reformer, such that the reformer fails.

We explain the reasons for this below. A partial oxidation reforming reaction, being an exothermic reaction, occurs inside the reformer, but because the partial oxidation reforming reaction is most prone to occur in the part where fuel gas supplied into the reformer first contacts the high temperature catalyst (the normal fuel gas intake part), an exothermic reaction occurs locally within the reformer. When this happens, if the flame transfer between fuel cells is not completed, the entire reformer is also heated from without by combustion heat from the combustion section, so that the reformer temperature is higher in the fuel gas intake part than other parts, but the temperature of the reformer as a whole rises and there are no localized excessive temperature rises.

On the other hand, if flame transfer between fuel cells is completed, heating of the reformer from without by the combustion section is also localized, and an exothermic reaction inside the reformer is also produced locally in said parts. Therefore if that state continues, the temperature rises in only a portion of the reformer, with the result that the reformer is damaged due to localized excessive temperature rises.

The object of the present invention is to provide a solid oxide fuel cell system capable of preventing localized excessive temperature rises in the reformer even in cases where time is required to complete the flame transfer between fuel cells.

Means for Solving the Problem

The above object is achieved according to the present invention by providing a solid oxide fuel cell system comprising: a cell stack having multiple adjacent fuel cells; a reformer that reforms raw gas and produces fuel gas supplied to the fuel cells; a combustion section that causes combustion of the fuel gas discharged from the fuel cells and heats the reformer with combustion heat of the fuel gas; an ignition device that ignites the combustion section; a combustion state confirmation device that senses that heating of the entire reformer has started using the advancement of flame transfer between fuel cells in the combustion section; and a controller programmed to start an operation of the system heating the reformer by using combustion heat from the combustion section and reaction heat from the partial oxidation reforming reaction (POX) in the reformer; wherein, during the period until the combustion state confirmation device senses that the heating of the entire reformer has started after the ignition device ignited the combustion section, the controller suppresses the amount of heat emitted by the partial oxidation reforming reaction in the reformer more than the amount of heat emitted after heating of the entire reformer has started.

In the present invention thus constituted, operation proceeds in a state wherein the heat amount from the partial oxidation reforming reaction in the reformer is suppressed during the period until the start of heating of the entire reformer is sensed by a combustion state confirmation device, i.e., during the period in which flame transfer between fuel cells is not yet completed, and heating of the reformer from the combustion section is still localized, therefore localized emission of heat from the interior of the reformer is suppressed. As a result, according to the present invention, localized excessive temperature rises of the reformer can be prevented.

In a preferred embodiment of the present invention, during the period until the combustion state confirmation device senses that the heating of the entire reformer has started after the ignition device ignited the combustion section, the controller suppresses the amount of heat emitted by the partial oxidation reforming reaction in the reformer by reducing at least one of either the raw gas supply amount or the reforming air supply amount supplied to the reformer more than the supply amount after heating of the entire reformer has started.

In the present invention thus constituted, during the period in which heating of the reformer from the combustion section is only localized, the amount of heat emitted by the partial oxidation reforming reaction in the reformer can be suppressed by the simple control of reducing at least one of either the raw gas supply amount or the reforming air supply amount. As a result, according to the present invention, localized excessive temperature rises of the reformer can be prevented.

In another preferred embodiment of the present invention, the combustion state confirmation device senses that heating of the entire reformer has started using the temperature of the combustion section.

In the present invention thus constituted, a reliable, error free sensing of whether heating of the reformer has started can be achieved by measuring the temperature of the combustion section, which is the source of external heating of the reformer.

In still another preferred embodiment of the present invention, the combustion state confirmation device comprises a reformer temperature sensor that senses the temperature of the reformer, and the combustion state confirmation device senses the temperature of the combustion section based on the reformer temperature sensed by the reformer temperature sensor.

In the present invention thus constituted, because the start of heating of the entire reformer is directly sensed by the combustion state confirmation means using the temperature of the reformer, which is the object of heating, the start of heating of the entire reformer can be reliably sensed without error.

In still another preferred embodiment of the present invention, the reformer temperature sensor senses the inlet and outlet temperatures of the reformer, and the combustion state confirmation device senses that heating of the entire reformer has started when the inlet temperature of the reformer is equal to or greater than a first predetermined temperature and the outlet temperature is equal to or greater than a second predetermined temperature, after the ignition device ignites the combustion section.

In the present invention thus constituted, the fact that flame transfer between fuel cells has proceeded and reformer temperature rise has started not locally but over the entirety of the reformer can be directly sensed, therefore appropriate timing for releasing the suppression of the heat emitted from the partial oxidation reforming reaction in the reformer can be accurately achieved.

Effect of the Invention

According to the present invention of the solid oxide fuel cell system, prevention of localized excessive temperature rise in the reformer can be enabled even when time is required for flame transfer between fuel cells.

EMBODIMENTS OF THE INVENTION

Next, referring to the attached drawings, we discuss a solid oxide fuel cell system (SOFC) according to an embodiment of the present invention.

Figure 1:
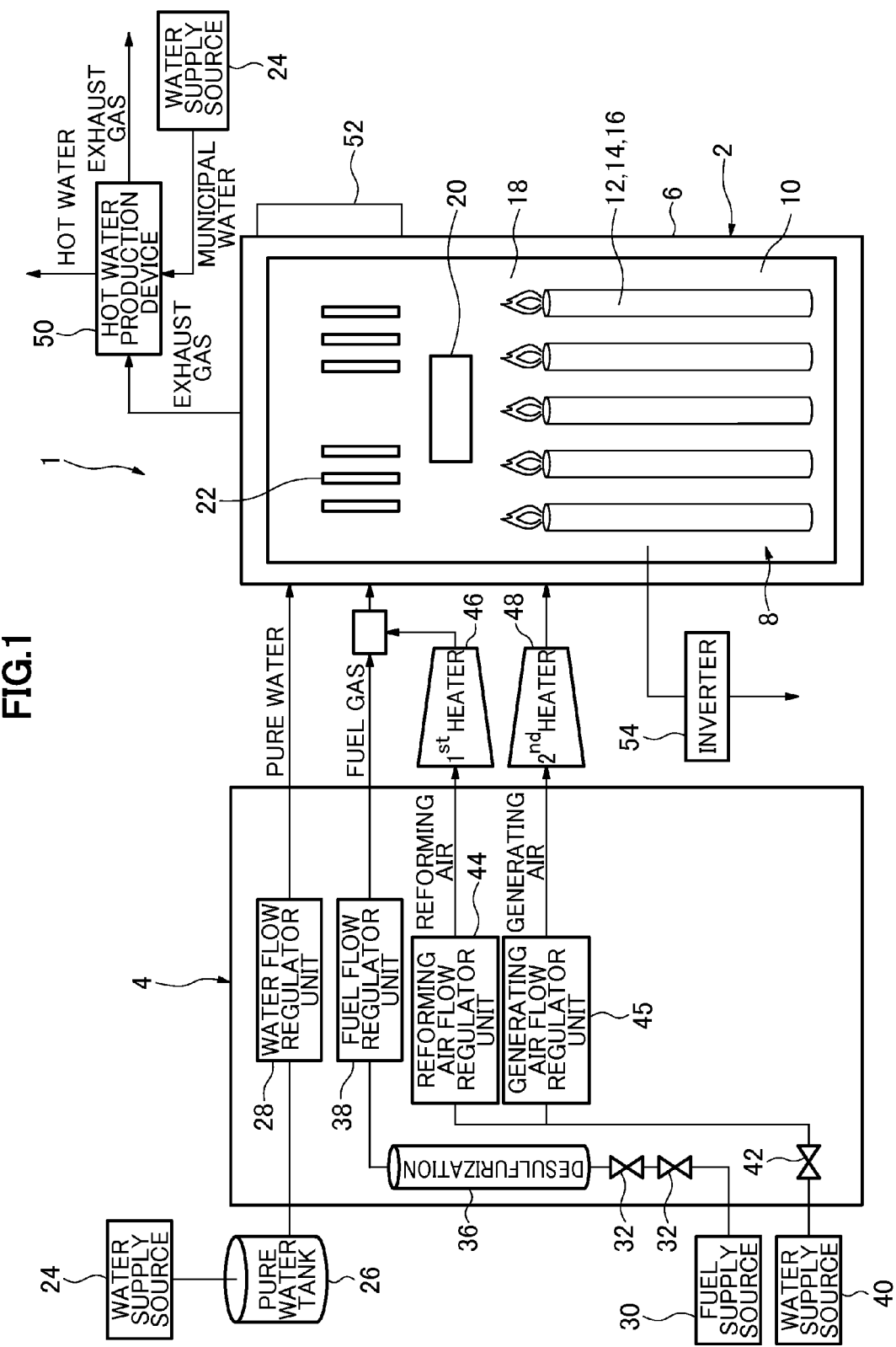
FIG. 1 is an overview diagram showing a solid oxide fuel cell system (SOFC) according to an embodiment of the present invention.

FIG. 1 is an overview diagram showing a solid oxide fuel cell system (SOFC) according to an embodiment of the present invention. As shown in FIG. 1, the solid oxide fuel cell system (SOFC) of the embodiment of the present invention is furnished with a fuel cell module 2 and an auxiliary unit 4.

The fuel cell module 2 is furnished with a housing 6; within this housing 6, a sealed space 8 is formed, mediated by thermal insulation (not insulated; thermal insulation is not a mandatory structure, and may be omitted). Note that it is acceptable not to provide thermal insulation. A fuel cell assembly 12 for carrying out the electrical generating reaction using fuel gas and oxidizer (air) is disposed in generating chamber 10, which is the lower part of this sealed space 8. This fuel cell assembly 12 is furnished with ten fuel cell stacks 14 (see FIG. 5); fuel cell stack 14 comprises 16 fuel cell units 16 (see FIG. 4). Thus, fuel cell assembly 12 has 160 fuel cell units 16, all of which are serially connected.

A combustion section 18 is formed above the aforementioned generating chamber 10 in fuel cell module 2 sealed space 8; residual fuel gas and residual oxidizer (air) not used in the electrical generation reaction are burned in this combustion section 18, producing exhaust gas.

A reformer 20 for reforming fuel gas is disposed at the top of the combustion section 18; reformer 20 is heated by the heat of residual gas combustion to a temperature at which the reforming reaction can take place.

An air heat exchanger 22 for receiving combustion heat and heating the air is further disposed above this reformer 20.

Next, auxiliary unit 4 is furnished with a pure water tank 26 for holding water from a municipal or other water supply source 24 and filtering it into pure water, and a water flow regulator unit 28 (a "water pump" or the like driven by a motor) for regulating the flow volume of water supplied from the reservoir tank. Auxiliary tank 4 is further furnished with a gas shutoff valve 32 for shutting off the fuel gas supply from a fuel supply source 30 such as municipal gas or the like, and a fuel flow regulator unit 38 (a "fuel pump" or the like driven by a motor) for regulating the flow volume of fuel gas. Furthermore, an auxiliary unit 4 is furnished with an electromagnetic valve 42 for shutting off air serving as an oxidizer and supplied from an air supply source 40, a reforming air flow regulator unit 44 and generating air flow regulator unit 45 ("air blower" or the like driven by a motor) for regulating air flow volume, a first heater 46 for heating reforming air supplied to the reformer 20, and a second heater 48 for heating generating air supplied to the generating chamber. This first heater 46 and second heater 48 are provided in order to efficiently raise the temperature at startup, but may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to fuel cell module 2.

Figure 2:
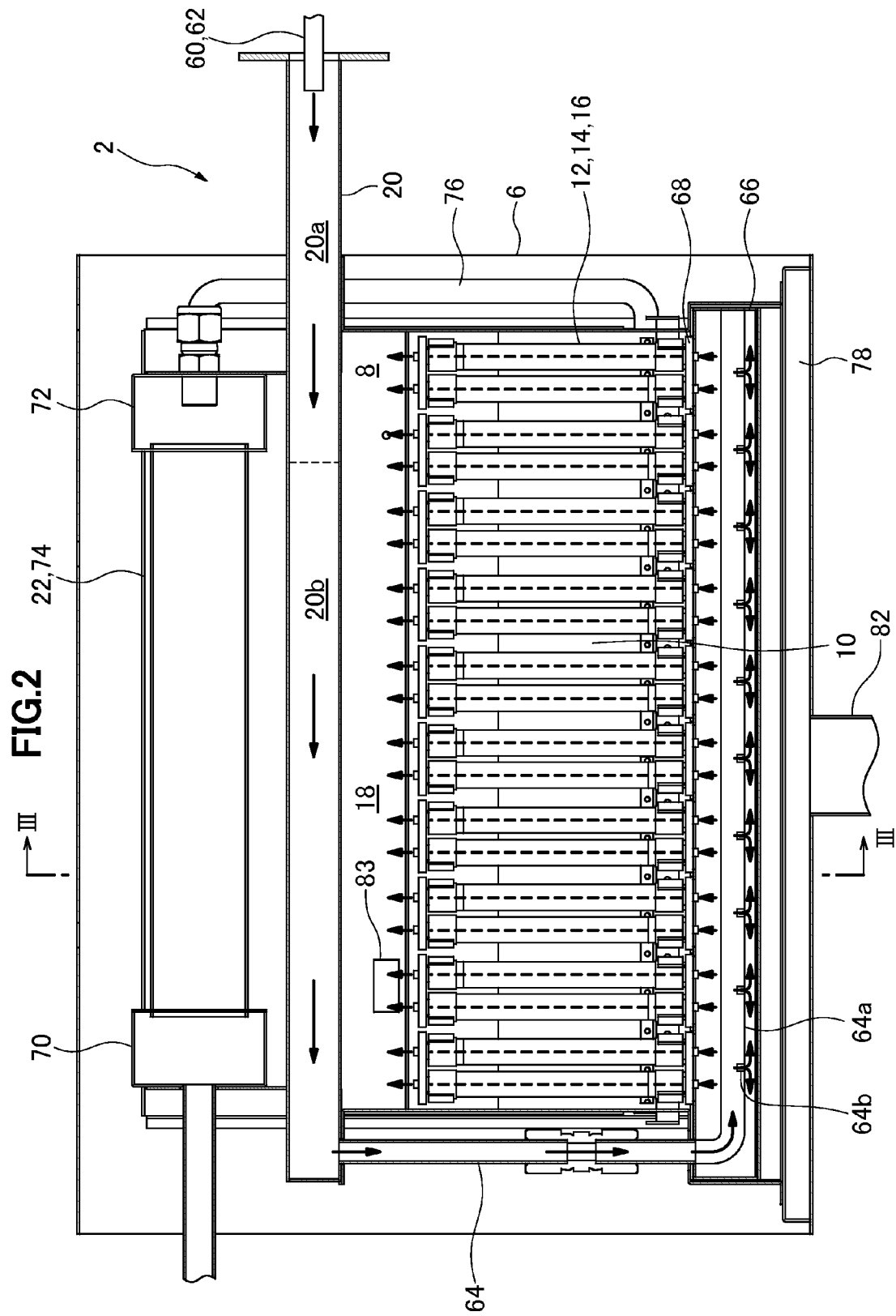
FIG. 2 is a front elevation section showing a solid oxide fuel cell system (SOFC) fuel cell module according to an embodiment of the present invention.
Figure 3:
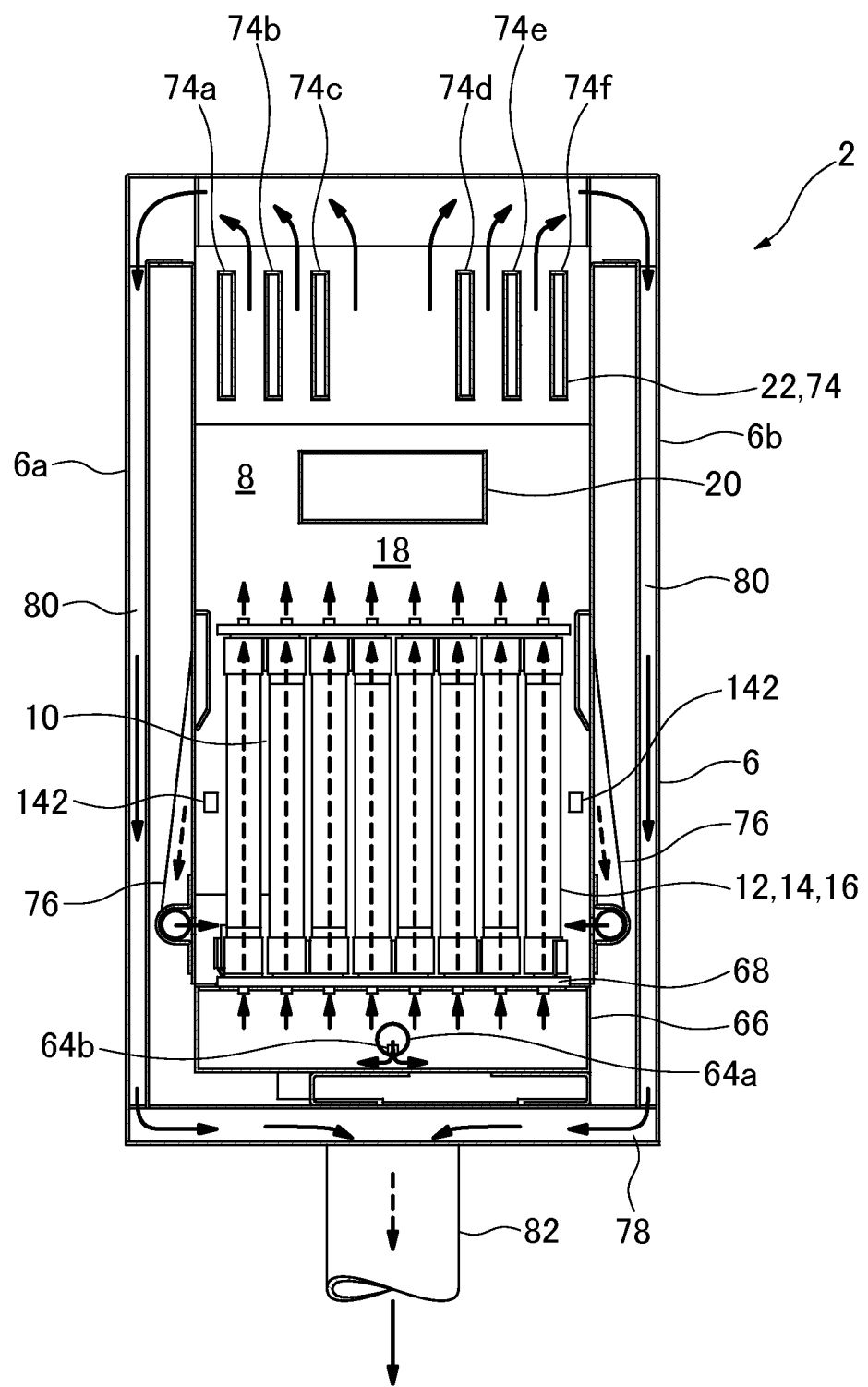
FIG. 3 is a sectional diagram along line III-III in FIG. 2.

The internal structure of fuel cell module of the solid oxide fuel cell system (SOFC) of this embodiment of the present invention is explained using FIGS. 2 and 3. FIG. 2 is a side elevation sectional diagram showing a fuel cell module in a solid oxide fuel cell system (SOFC) according to an embodiment of the present invention; FIG. 3 is a sectional diagram along line III-III of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of reformer 20, and a reform gas guide pipe 62 for introducing the fuel gas and reforming air to be reformed, are attached to reformer 20; a vaporizing section 20a and a reforming section 20b are formed in sequence starting from the upstream side within reformer 20, and reforming section 20b is filled with a reforming catalyst. Fuel gas and air blended with the steam (pure water) introduced into reformer 20 is reformed by the reforming catalyst used to fill in reformer 20. Appropriate reforming catalysts are used, such as those in which nickel is imparted to the surface of aluminum spheres, or ruthenium is imparted to the surface of aluminum spheres.

A fuel gas supply line 64 is connected to the downstream end of reformer 20; this fuel gas supply line 64 extends downward, then further extends horizontally within a manifold formed under fuel cell assembly 12. Multiple fuel supply holes 64b are formed on the bottom surface of a horizontal portion 64a of fuel gas supply line 64; reformed fuel gas is supplied into manifold 66 from these fuel supply holes 64b.

A lower support plate 68 provided with through holes for supporting the above-described fuel cell stack 14 is attached at the top of manifold 66, and fuel gas in manifold 66 is supplied into fuel cell units 16.

Next, an air heat exchanger 22 is provided over reformer 20. This air heat exchanger 22 is furnished with an air concentration chamber 70 on the upstream side and two air distribution chambers 72 on the downstream side; this air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from combustion section 18.

Air guide pipes 76 are connected to each of the respective air distribution chambers 72; these air guide pipes 76 extend downward, communicating at the bottom end side with the lower space in generating chamber 10, and introducing pre-heated air into generating chamber 10.

Next, an exhaust gas chamber 78 is formed below manifold 66. As shown in FIG. 3, an exhaust gas conduit 80 extending in the vertical direction is formed on the insides of front surface 6a and rear surface 6b which form the faces in the longitudinal direction of housing 6; the top inside of exhaust gas conduit 80 communicates with the space in which air heat exchanger 22 is disposed, and the bottom end side communicates with exhaust gas chamber 78.

An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on combustion section 18.

Figure 4:
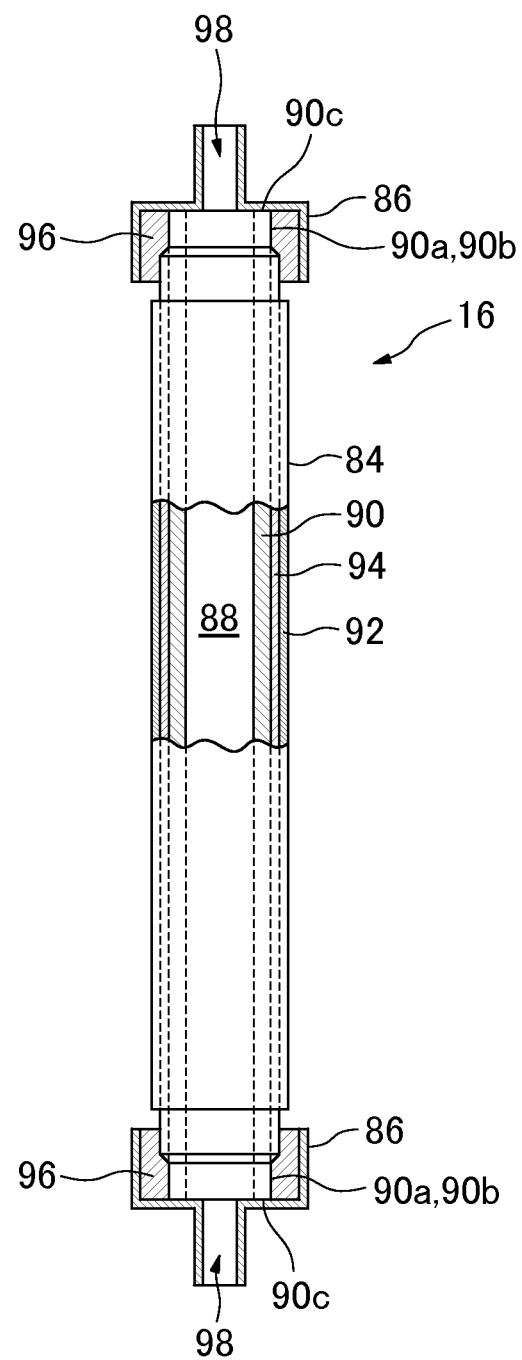
FIG. 4 is a partial section showing a fuel cell unit of the solid oxide fuel cell system (SOFC) according to an embodiment of the present invention.

Next, referring to FIG. 4, we discuss fuel cell units 16. FIG. 4 is a partial section showing a fuel cell unit of the solid oxide fuel cell system (SOFC) according to an embodiment of the present invention.

As shown in FIG. 4, fuel cell units 16 are furnished with a fuel cell 84 and internal electrode terminals 86, respectively connected to the respective terminals at the top and bottom of fuel cell 84.

Fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between internal electrode layer 90 and external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom end of fuel cell units 16 have the same structure, therefore we will here discuss specifically the internal electrode terminal 86 attached at the top and side. The top portion 90a of inside electrode layer 90 is furnished with an outside perimeter surface 90b and top end surface 90c, exposed to electrolyte layer 94 and outside electrode layer 92. Inside electrode terminal 86 is connected to the outer perimeter surface of inside electrode layer 90 through a conductive seal material 96, and is electrically connected to inside electrode layer 19 by making direct contact with the top end surface 90c of inside electrode layer 90. A fuel gas flow path 98 communicating with the inside electrode layer 90 fuel gas flow path 88 is formed at the center portion of inside electrode terminal 86.

Inside electrode layer 90 is formed, for example, from at least one of a mixture of Ni and zirconia doped with at least one type of rare earth element selected from among Ni, Ca, Y, Sc, or the like; or a mixture of Ni and ceria doped with at least one type of rare earth element; or any mixture of Ni with lanthanum gallate doped with at least one [element] selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver; or the like.

Figure 5:
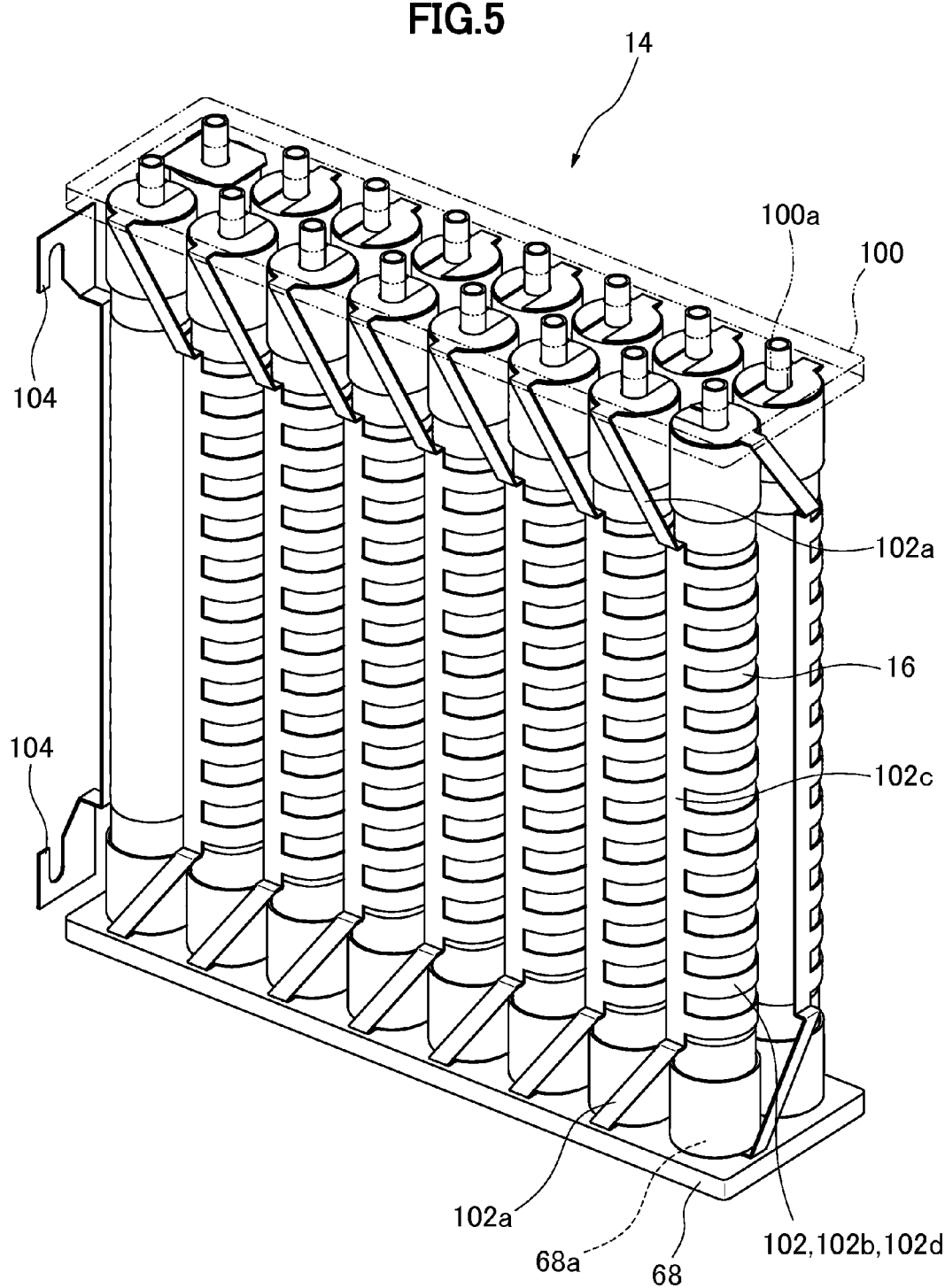
FIG. 5 is a perspective view showing the fuel cell stack in a solid oxide fuel cell system (SOFC) according to an embodiment of the present invention.

Next, referring to FIG. 5, we discuss fuel cell stack 14. FIG. 5 is a perspective view showing the fuel cell stack in a solid oxide fuel cell system (SOFC) according to an embodiment of the present invention.

As shown in FIG. 5, fuel cell stack 14 is furnished with sixteen fuel cell units 16; the top inside and bottom inside of these fuel cell units 16 are respectively supported by a lower support plate 68 and upper support plate 100. Through holes 68a and 100a, through which the inside electrode terminal 86 can penetrate, are provided on this lower support plate 68 and outer support plate 100.

In addition, a collector 102 and an external terminal 104 are attached to fuel cell units 16. This collector 102 is integrally formed by a fuel electrode connecting portion 102a, which is electrically connected to inside electrode terminal 86 attached to inside electrode layer 90 serving as the fuel electrode, and by an air electrode connecting portion 102b, which is electrically connected to the entire external perimeter of outside electrode layer 92 serving as the air electrode. The air electrode connecting portion 102b is formed of a vertical portion 102c extending vertically along the surface of outside electrode layer 92, and multiple horizontal portions 102d extending in the horizontal direction from this vertical portion 102c along the surface of outside electrode layer 92. Fuel electrode connecting portion 102a extends linearly in an upward or downward diagonal direction from the vertical portion 102c of air electrode connecting portion 102b toward inside electrode terminals 86 positioned in the upper and lower directions on fuel cell units 16.

Furthermore, electrode terminals 86 at the top and bottom ends of the two fuel cell units 16 positioned at the end of fuel cell stack 14 (at the front and back sides on the left edge in FIG. 5) are respectively connected to outside terminals 104. These external terminals 104 are connected to external terminals 104 (not shown) at the ends of adjacent fuel cell stack 14, and as described above, all of the 160 fuel cell units 16 are connected in series.

Figure 6:
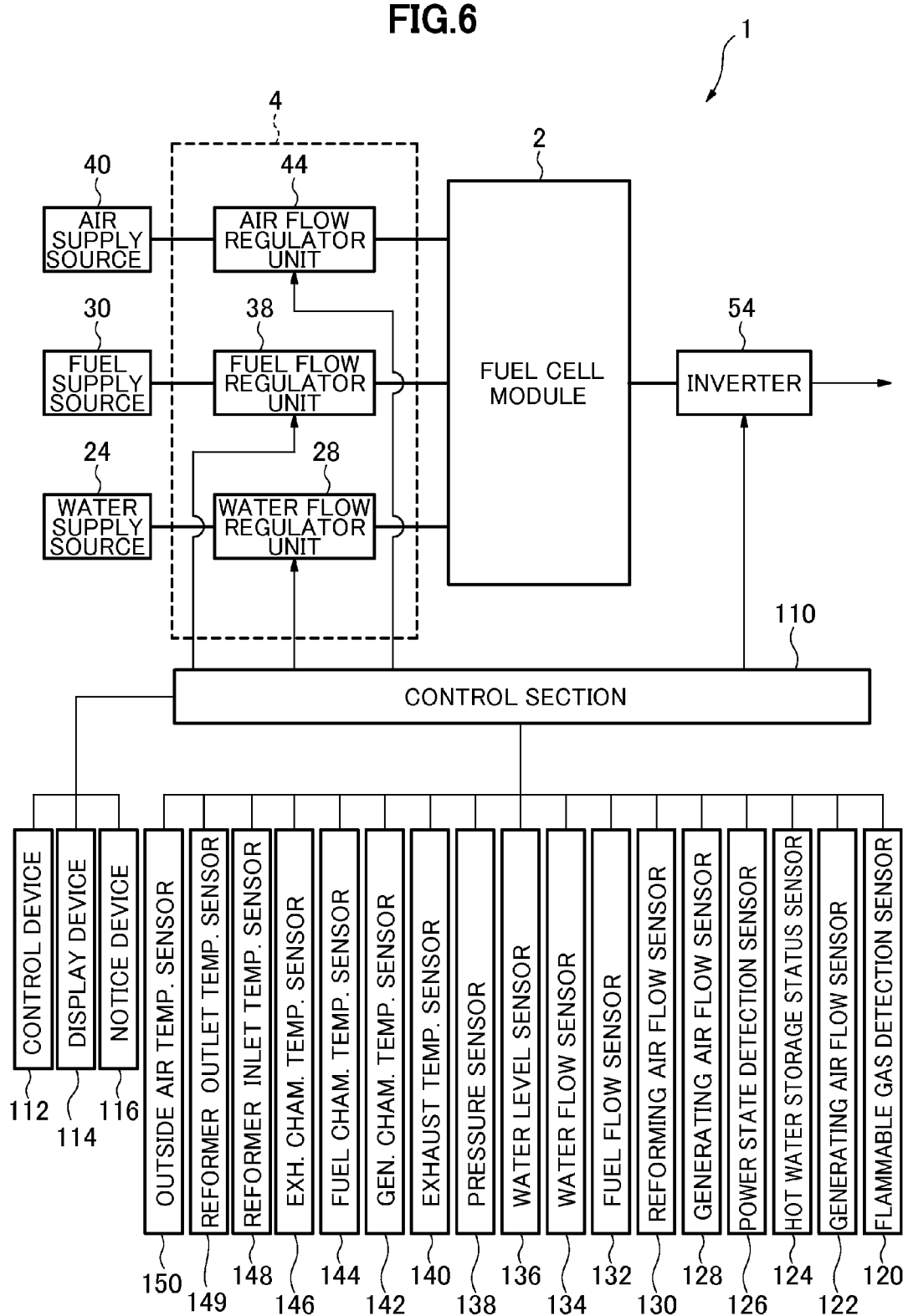
FIG. 6 is a block diagram showing a solid oxide fuel cell system (SOFC) according to an embodiment of the present invention.

Next, referring to FIG. 6, we discuss the sensors attached to the solid oxide fuel cell system (SOFC) according to the present embodiment. FIG. 6 is a block diagram showing a solid oxide fuel cell system (SOFC) according to an embodiment of the present invention.

As shown in FIG. 6, a solid oxide fuel cell system 1 is furnished with a control unit 110; connected to this control section 110 are: an operating device 112 provided with operating buttons such as "ON" or "OFF" for user operation, a display device 114 for displaying various data such as a generator output value (Watts), and a notification device 116 for issuing warnings during abnormal states and the like. This notification device 116 may also be one which is connected to a remote control center to inform this control center of abnormal states.

Next, signals from the various sensors described below are input to control unit 110.

First, flammable gas detection sensor 120 is for detecting gas leaks; it is attached to fuel cell module 2 and auxiliary unit 4.

The purpose of flammable gas detection sensor 120 is to detect whether CO in the exhaust gas, which is supposed to be exhausted to the outside via exhaust gas conduit 80, has leaked into the external housing (not shown) which covers fuel cell module 2 and auxiliary unit 4.

A water reservoir state detection sensor 124 detects the temperature and amount of hot water in a water heater (not shown).

An electrical power state detection sensor 126 detects current, voltage, and the like in inverter 54 and in a distribution panel (not shown).

A generator air flow detection sensor 128 detects the flow volume of generator air supplied to generating chamber 10.

A reforming air flow volume sensor 130 detects the volume of reforming air flow supplied to reformer 20.

A fuel flow volume sensor 132 detects the flow volume of fuel gas supplied to reformer 20.

A water flow volume sensor 134 detects the flow volume of pure water (steam) supplied to reformer 20.

A water level sensor 136 detects the water level in pure water tank 26.

A pressure sensor 138 detects pressure on the upstream side outside reformer 20.

An exhaust temperature sensor 140 detects the temperature of exhaust gas flowing into hot water producing device 50.

As shown in FIG. 3, a generating chamber temperature sensor 142 is disposed on the front surface side and rear surface side around fuel cell assembly 12; its purpose is to detect the temperature near fuel cell stack 14 and estimate the temperature of fuel cell stack 14 (i.e., of the fuel cell 84 itself).

A combustion chamber temperature sensor 144 detects the temperature in combustion section 18.

An exhaust gas chamber temperature sensor 146 detects the temperature of exhaust gases in exhaust gas chamber 78.

A reformer inlet temperature sensor 148 detects the inlet temperature of reformer 20; a reformer temperature outlet sensor 149 detects the outlet temperature of reformer 20.

If the solid oxide fuel cell system (SOFC) is placed outdoors, outside temperature sensor 150 detects the temperature of the outside atmosphere. Sensors to detect outside atmospheric humidity and the like may also be provided.

Signals from these various sensor types are sent to control unit 110; control unit 110 sends control signals to water flow regulator unit 28, fuel flow regulator unit 38, reforming air flow regulator unit 44, and generating air flow regulator unit 45 based on data from the sensors, and controls the flow volumes in each of these units.

Control unit 110 sends control signals to inverter 54 to control the quantity of electrical power supply.

Figure 7:
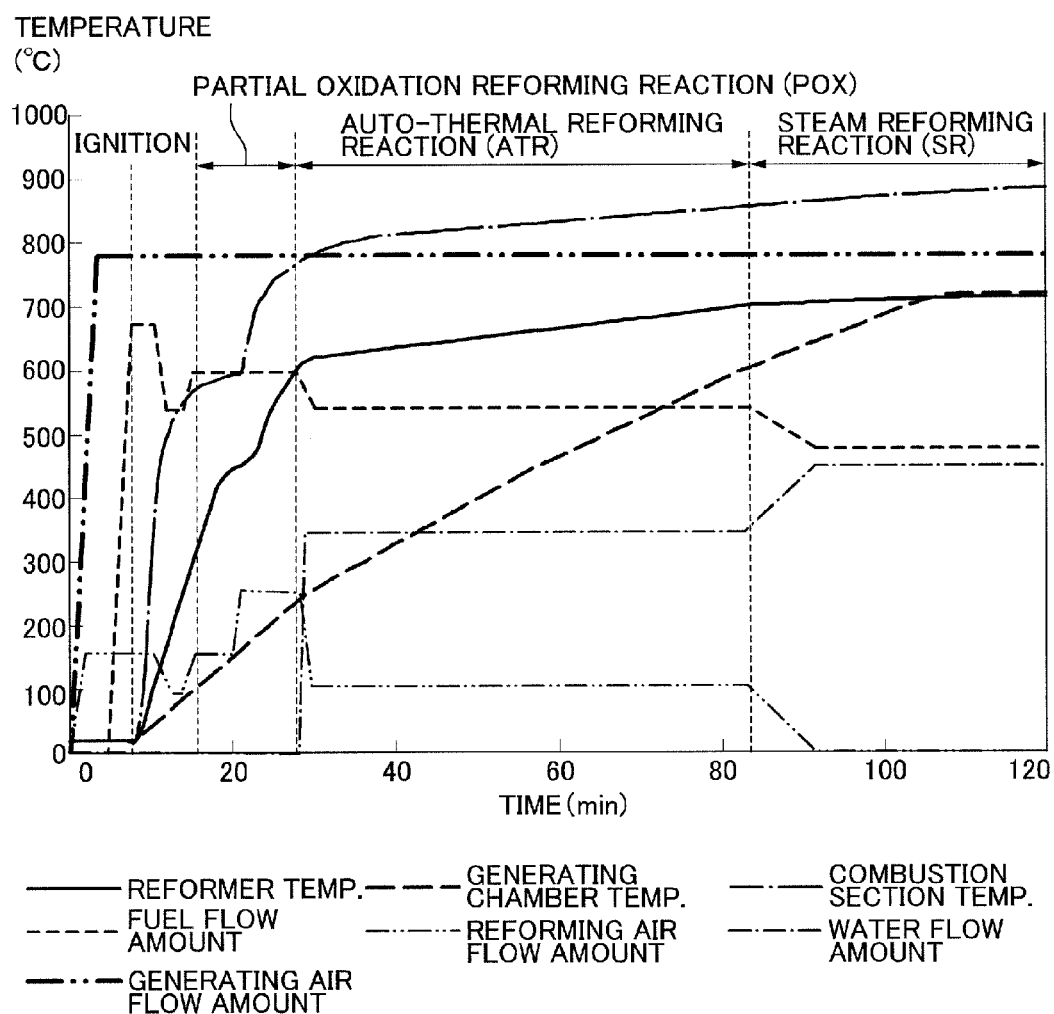
FIG. 7 is a timing chart showing the operations of a solid oxide fuel cell system (SOFC) according to an embodiment of the present invention at the time of start up.
Figure 9:
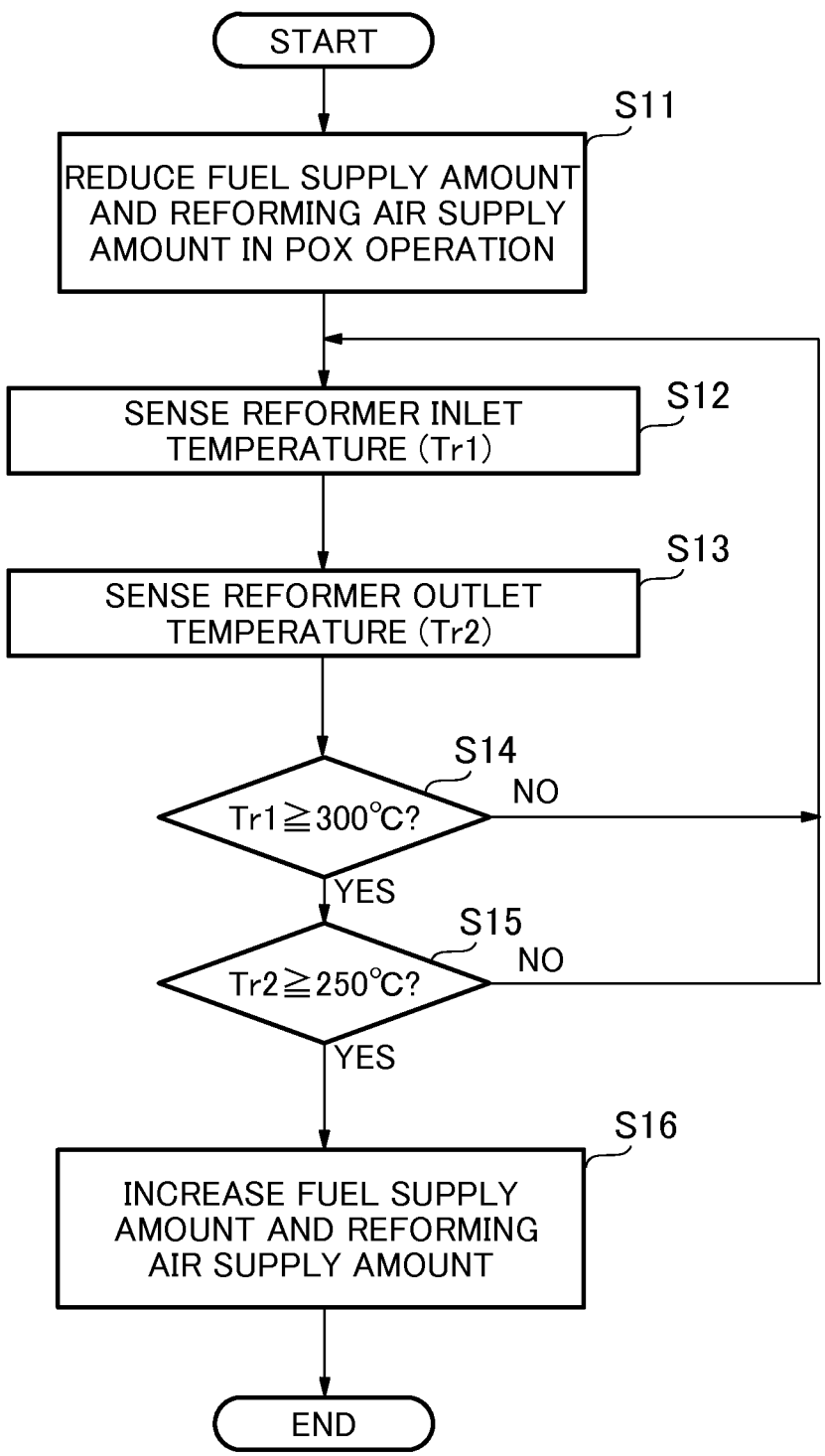
FIG. 9 is a timing chart showing the operations of a solid oxide fuel cell system (SOFC) at the time of start up according to an embodiment of the present invention.

Next, using FIGS. 7 and 9, we discuss the operation upon startup of a solid oxide fuel cell system (SOFC) according to an embodiment of the present invention. FIG. 7 is a timing chart showing the operations of a solid oxide fuel cell system (SOFC) at the time of start up according to an embodiment of the present invention. FIG. 9 is a timing chart showing the operations of a solid oxide fuel cell system (SOFC) at the time of start up according to an embodiment of the present invention.

At the beginning, operation starts in a no-load state, i.e., with the circuit which includes fuel cell module 2 in an open state, in order to warm up fuel cell module 2. At this point current does not flow in the circuit, therefore fuel cell module 2 does not generate electricity.

First, reforming air is supplied from reforming air flow regulator unit 44 to reformer 2 on fuel cell module 2. At the same time, generating air is supplied from generating air flow regulator unit 45 to air heat exchanger 22 of fuel cell module 2, and this generating air reaches generating chamber 10 and combustion section 18.

Immediately thereafter, fuel gas is also supplied from fuel flow regulator unit 38, and fuel gas into which reforming air is blended passes through reformer 20, fuel cell stack 14, and fuel cell units 16 to reach combustion section 18.

Next, ignition is brought about by the ignition device 83, and fuel gas and air (reforming air and generating air) supplied to combustion section 18 is combusted. This combustion of fuel gas and air produces exhaust gas; generating chamber 10 is warmed by this exhaust gas, and when the exhaust gas rises into fuel cell module 2 sealed space 8, the fuel gas, which includes reforming air in reformer 20, is warm, as is the generating air inside air heat exchanger 22.

Once ignition has been confirmed by a temperature rise in the combustion section, operation of the fuel flow regulator unit 38 and reform air flow regulator unit 44 reduces the fuel supply amount and reforming air supply amount supplied to reformer 20 more than the fuel supply amount and reforming air supply amount following heating of the entire reformer, described below (step S11).

Thus the state in which the fuel supply amount and reforming air supply amount are reduced continues until the detected temperatures by the reformer inlet temperature sensor 148 and reformer outlet temperature sensor 149 respectively exceed 300° C. and 250° C. (step S12, step S13). By controlling in this way, the advance of the partial oxidation reforming reaction POX shown in Expression (1) is suppressed. This partial oxidation reforming reaction POX is an exothermic reaction, therefore temperature rises in the reformer 20 are suppressed by this suppression of the partial oxidation reforming reaction POX.

$$C_mH_n + xO_2 \to aCO_2 + bCO + cH_2 \qquad (1)$$

Thereafter, if flame transfer between fuel cells in combustion section 18 advances, the entire reformer 20 is heated by the heat from combustion section 18. At the point in time when it is confirmed that the temperatures detected by reformer inlet temperature sensor 148 and reformer outlet temperature sensor 149 have respectively exceeded 300° C. and 250° C. (steps S14, S15), i.e., when it is sensed that heating of the entire reformer 20 by the combustion heat from combustion section 18 has begun, the fuel flow regulator unit 38 and reform air flow regulator unit 44 increase the fuel supply amount and reforming air supply amount supplied to reformer 20 is increased by more than the fuel supply amount and reforming air supply amount prior to the start of heating of the entire reformer (step S16). In the present embodiment, reformer inlet temperature sensor 148 and reformer outlet temperature sensor 149 are combustion state confirmation means.

The amount of heat emitted by the partial oxidation reforming reaction POX is increased by the increase in fuel supply amount and reforming air supply amount supplied to reformer 20. There is also sufficient heating from within reformer 20, and good startup characteristics are achieved. This elevated-temperature fuel gas is supplied from fuel gas supply line 64 to the bottom of fuel cell stack 14, and by this means fuel cell stack 14 is heated from the bottom; combustion section 18 is also heated by the combustion of the fuel gas and air, so that fuel stack 14 is also heated from above, thereby enabling an essentially uniform rise in temperature in the vertical direction of fuel cell stack 14. Even though the partial oxidation reforming reaction POX is progressing, the ongoing combustion reaction between fuel gas and air is continued in combustion section 18.

After startup of the partial oxidation reforming reaction POX, when reformer inlet temperature sensor 148 senses that the reformer 20 temperature has reached a predetermined temperature (e.g., 600° C.), a gas containing a premixture of fuel gas, reforming air, and steam is supplied to reformer 20 by fuel flow regulator unit 38 and reform air flow regulator unit 44. At this point, an auto-thermal reforming reaction ATR, which makes use of both the aforementioned partial oxidation reforming reaction POX and the steam reforming reaction SR described below, proceeds in reformer 20. This auto-thermal reforming reaction ATR can be internally thermally balanced, therefore the reaction proceeds in a thermally independent fashion inside reformer 20. In other words, if oxygen (air) is abundant, heat emission by the partial oxidation reforming reaction POX dominates, and if steam is abundant, the endothermic steam reforming reaction SR dominates. At this stage, the initial stage of startup has passed and some degree of elevated temperature has been achieved within generating chamber 10, therefore even if the endothermic reaction is dominant, no major drop in temperature will be caused. Also, the combustion reaction continues within combustion section 18 even as the auto-thermal reforming reaction ATR proceeds.

When reformer temperature sensor 146 senses that reformer 20 has reached a predetermined temperature after starting auto-thermal reforming reaction ATR (e.g., 700° C.), the supply of reforming air by reforming air flow regulator unit 44 is stopped and the supply of steam by water flow regulator unit 28 is increased. A gas containing no air and only containing fuel gas and steam is thus supplied to the reformer 20, where the steam reforming reaction SR of Expression (3) proceeds.

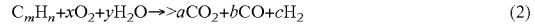

$$C_mH_n + xO_2 + yH_2O \to aCO_2 + bCO + cH_2 \qquad (2)$$

$$C_mH_n + xH_2O \to aCO_2 + bCO + cH_2 \qquad (3)$$

This steam reforming reaction SR is an endothermic reaction, therefore the reaction proceeds as thermal balance is maintained with the combustion heat from combustion section 18. At this stage, the fuel cell module is in the final stages of startup, therefore the temperature has risen to a sufficiently high level within generating chamber 10 so that no major temperature dropped is induced in generating chamber 10 even though an endothermic reaction is proceeding. Also, the combustion reaction continues to proceed in combustion section 18 even as the steam reforming reaction SR is proceeding.

Thus, after fuel cell module 2 has been ignited by ignition device 83, the temperature inside generating chamber 10 gradually rises as a result of the partial oxidation reforming reaction POX, the auto-thermal reforming reaction ATR, and the steam reforming reaction SR proceeding in sequence. Next, when the temperatures of interior of generating chamber 10 and individual fuel cells 84 reach a predetermined generating temperature below the rated temperature at which fuel cell module 2 can be stably operated, the circuit including fuel cell module 2 is closed and electrical generation by fuel cell module 2 begins, such that current flows in the circuit. Generation of electricity by fuel cell module 2 causes fuel cell 84 itself to emit heat, such that the temperature of fuel cell 84 rises. As a result, the rated temperature for operating fuel cell module 2, for example 600° C. to 800° C., is reached.

Thereafter, in order to maintain the rated temperature, fuel gas and air are supplied in a quantity greater than the fuel gas and air consumed by individual fuel cells 84. During electrical generation, generation of electricity by the high reforming efficiency steam reforming reaction SR proceeds.

Figure 8:
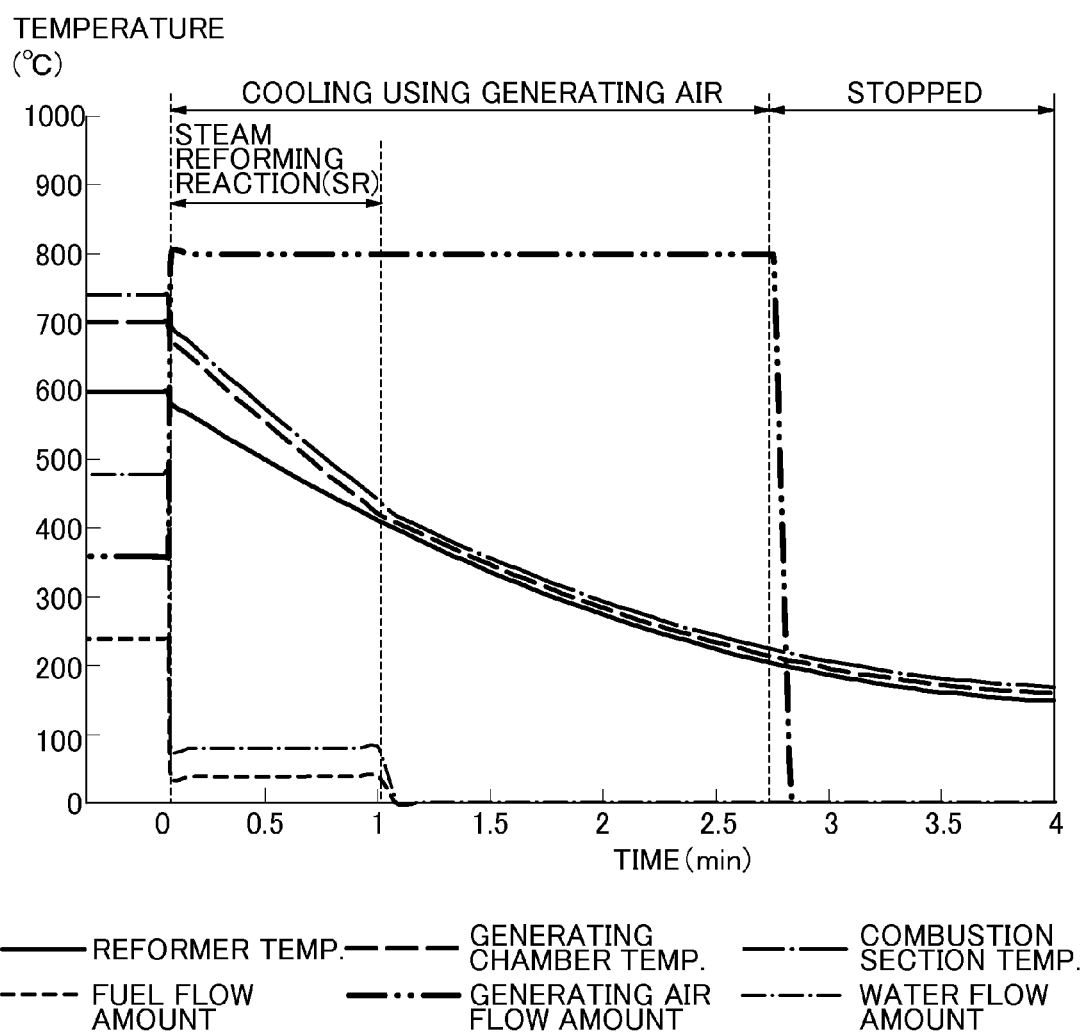
FIG. 8 is a timing chart showing the operations of a solid oxide fuel cell system (SOFC) at the time operation is stopped according to an embodiment of the present invention.

Next, referring to FIG. 8, we discuss the operation upon stopping the solid oxide fuel cell system (SOFC) of the present embodiment. FIG. 8 is a timing chart showing what occurs upon stopping the operation of solid oxide fuel cell system (SOFC) of the present embodiment.

As shown in FIG. 8, when the operation of fuel cell module 2 is stopped, fuel flow regulator unit 38 and water flow regulator unit 28 are first controlled to reduce the quantity of fuel gas and steam being supplied to reformer 20.

When stopping the operation of the fuel cell module 2, the amount of generating air supplied by reforming air flow regulator unit 44 into fuel cell module 2 is being increased at the same time that the amount of fuel gas and steam being supplied to reformer 20 is being reduced; fuel cell assembly 12 and reformer 20 are air cooled to reduce their temperatures. Thereafter when the temperature in the generating chamber gets down to a predetermined temperature, for example 400° C., the supply of fuel gas and steam to reformer 20 is stopped and the steam reforming reaction in reformer 20 ends. Supply of generating air continues until the temperature in reformer 20 reaches a predetermined temperature, e.g. 200° C.; when the predetermined temperature is reached, the supply of generating air from generating air flow regulator unit 45 is stopped.

Thus in the present embodiment, the steam reforming reaction SR by reformer 20 and cooling by generating air are used in combination, therefore when operation of the fuel cell module 2 is stopped, that operation can be stopped relatively quickly.

What is claimed is:

1. A solid oxide fuel cell system comprising:
    a cell stack having adjacently arranged multiple fuel cells;
    a reformer configured to reform raw gas and produce fuel gas supplied to the fuel cells for generation of electricity at the fuel cells;
    a combustion section configured to burn residual fuel gas unused for generation of electricity and discharged from outlets of the fuel cells, wherein the reformer is heated by heat from the burning residual fuel gas in the combustion section;
    an ignition device configured to ignite the residual fuel gas from the outlets of the fuel cell in the combustion section, wherein upon an ignition by the ignition device, burning of the residual fuel gas begins locally over the outlets of the fuel cells and heats the reformer only locally, and then burning of the residual fuel gas progresses to spread over the entire outlets of the fuel cells and heats the reformer generally;
    a combustion state confirmation device configured to detect that burning of the residual fuel gas has spread over the entire outlets of the fuel cells and starts heating the reformer generally, wherein the combustion state confirmation device comprises a first temperature sensor operable to detect an inlet temperature of the reformer and a second temperature sensor operable to detect an outlet temperature of the reformer; and
    a controller programmed to perform a startup operation of the solid oxide fuel cell system in which the fuel cells are raised to an operation temperature at which electricity is ready to be extracted from the fuel cells, the startup operation implementing, in the reformer, a partial oxidation reforming (POX) reaction during which the reformer is heated by heat from the burning residual fuel gas in the combustion section and by reaction heat generated from the reaction taking place in the reformer,
    wherein the controller is further programmed to operate the solid oxide fuel cell system to:
    upon an ignition of the residual fuel gas by the ignition device, reduce generation of the reaction heat from the POX reaction and keep generation reduced of the reaction heat from the POX reaction while burning of the residual fuel gas undergoes locally over the outlets of the fuel cells and heats the reformer only locally; and
    upon a determination by the controller that the inlet and outlet temperatures of the reformer detected, respectively, by the first and second temperature sensors become no longer lower than a first and second predetermined temperature, respectively, raise, from its reduced state, generation of the reaction heat from the POX reaction, wherein the first and second predetermined temperatures are set to indicate that burning of the residual fuel gas progresses to spread over the entire outlets of the fuel cells and starts heating the reformer generally.

2. The solid oxide fuel cell system according to claim 1, wherein, the controller is programmed to reduce at least one of supply of the raw gas to the reformer and supply of reforming air to the reformer to thereby reduce generation of the reaction heat from the POX reaction.

* * * * *